US006426746B2

United States Patent
Hsieh et al.

(10) Patent No.: US 6,426,746 B2
(45) Date of Patent: Jul. 30, 2002

(54) OPTIMIZATION FOR 3-D GRAPHIC TRANSFORMATION USING SIMD COMPUTATIONS

(75) Inventors: Hsien-Cheng E. Hsieh, Gold River; Mohammad Abdallah, Folsom, both of CA (US)

(73) Assignee: Intel Corporation, Santa Clara, CA (US)

( * ) Notice: Subject to any disclaimer, the term of this patent is extended or adjusted under 35 U.S.C. 154(b) by 61 days.

(21) Appl. No.: 09/053,390

(22) Filed: Mar. 31, 1998

(51) Int. Cl.[7] .............................................. G06T 15/00
(52) U.S. Cl. ..................................................... 345/419
(58) Field of Search ........................ 345/419; 708/607, 708/401, 520

(56) References Cited

U.S. PATENT DOCUMENTS 5,857,082 A  * 1/1999  Murdoch et al. ............ 395/308
6,008,820 A  * 12/1999  Chauvin et al. ............ 345/502

OTHER PUBLICATIONS

A Processor Architecture for 3–D Graphics Calculations, Yulun Wang, Amante Mangaser, Partha Srinivasan, Computer Motion, Inc., pp 1–23.
Parallel Computers for Graphics Applications (Proceedings: Second International Conference . . . ), Levinthal, et al., 1987, pp 193–198.
A SIMD Graphics Processor, Adam Levinthal, Thomas Porter, 1984, pp 77–82.
Architecture of a Braodband Mediaprocessor (Proceedings of COMPCON '96), Craig Hansen, 1996, pp 334–354.
64–bit and Multimedia Extensions in the PA–RISC 2.0 Architecture, Computing Directory Technologies Precision Architecture Document, Jul. 17, 1997.
Silicon Graphics Introduces Enhanced MIPS Architecture to Lead the Interactive Digital Revolution, Oct. 21, 1996.
21164 Alpha Microprocessor Data Sheet, Samsung Electronics, 1997.
TM1000 Preliminary Data Book, Philips Semidconductors, Jul. 1, 1997, pp i–xx. A–1 through A–202.
Visual Instruction Set (VIS) User's Guide, Sun Microsystems, Version 1.1, Mar. 1997, pp i–xii, 1–127.
AMD–3D Technology Manual, Advance Micro Devices, (AMD), Feb. 1998, pp i–x, 1–58.
MIPS Extension for Digital Media with 3D, MIPS Technologies, Inc., Mar. 12, 1997, pp 0–26.

* cited by examiner

Primary Examiner—Mark Zimmerman
Assistant Examiner—Lance W. Sealey
(74) Attorney, Agent, or Firm—Blakely, Sokoloff, Taylor & Zafman LLP

(57) ABSTRACT

The present invention discloses a method and apparatus for optimizing three-dimensional (3-D) transformation on N vertices of a data object based on a transformation matrix of size K×K. The method comprises: storing coordinates of the N vertices in K data items, each of the K data items having N elements; and scheduling a sequence of M operations with a set of P storage elements, the sequence of M operations performing a matrix multiplication of the transformation matrix with the K data items to produce transformed K data items, the set of P storage elements storing a plurality of intermediate results produced by the sequence of M operations.

30 Claims, 10 Drawing Sheets

$$\begin{pmatrix} \underline{X}_0 \\ \underline{Y}_0 \\ \underline{Z}_0 \\ \underline{W}_0 \end{pmatrix} = \begin{pmatrix} \underline{M}_{00} & \underline{M}_{01} & \underline{M}_{02} & \underline{M}_{03} \\ \underline{M}_{10} & \underline{M}_{11} & \underline{M}_{12} & \underline{M}_{13} \\ \underline{M}_{20} & \underline{M}_{21} & \underline{M}_{22} & \underline{M}_{23} \\ \underline{M}_{30} & \underline{M}_{31} & \underline{M}_{32} & \underline{M}_{33} \end{pmatrix} \begin{pmatrix} \underline{X} \\ \underline{Y} \\ \underline{Z} \\ 1 \end{pmatrix}$$

FIG. 4A $$\begin{pmatrix} \underline{X}_1 \\ \underline{Y}_1 \\ \underline{Z}_1 \end{pmatrix} = \frac{1}{\underline{W}_0} \begin{pmatrix} \underline{X}_0 \\ \underline{Y}_0 \\ \underline{Z}_0 \end{pmatrix} + \begin{pmatrix} \underline{D}_X \\ \underline{D}_Y \\ \underline{D}_Z \end{pmatrix}$$

| STEP | LOAD | MULTIPLY | ADD | STORE |
|---|---|---|---|---|
| 1 | [X] → R0 | | | |
| 2 | [M30] → R3 | | | |
| 3 | [Y] → R1 | | | |
| 4 | [M31] → R4 | | | |
| 5 | [Z] → R2 | R0 * R3 → R3 | | |
| 6 | [M32] → R5 | | | |
| 7 | [M00] → R6 | R1 * R4 → R4 | | |
| 8 | [M01] → R7 | | | |
| 9 | ×[M02] → R8 | R2 * R5 → R5 | | |
| 10 | ×[M10] → R9 | R0 * R6 → R6 | | |
| 11 | ☐[M33] → R10 | R1 * R7 → R7 | | |
| 12 | ×[M11] → R11 | ×R2 * R8 → R8 | R4 + R3 → R3 | |
| 13 | ×[M12] → R12 | ×R0 * R9 → R9 | | |
| 14 | ☐[M03] → R4 | | ×R10 + R5 → R5 | |
| 15 | ×[M20] → R10 | ×R1 * R11 → R11 | | |
| 16 | ×[M21] → R13 | ×R2 * R12 → R12 | R6 + R7 → R7 | |
| 17 | ×[M22] → R6 | | R5 + R3 → R3 | |
| 18 | ☐[M13] → R5 | ×R0 * R10 → R10 | ×R4 + R8 → R8 | |
| 19 | | ×R1 * R13 → R13 | | |
| 20 | | ×R2 * R6 → R6 | 1/R3 → R3 | |
| 21 | | | ×R8 + R7 → R7 | |
| 22 | ☐[M23] → R8 | | ×R9 + R11 → R11 | |
| 23 | | | ×R5 + R12 → R12 | |
| 24 | ×[DX] → R5 | R3 * R7 → R7 | ×R10 + R8 → R8 | |
| 25 | | | ×R13 + R6 → R6 | |
| 26 | | | ×R12 + R11 → R11 | |
| 27 | ×[DY] → R12 | | | |
| 28 | | | ×R6 + R8 → R8 | |
| 29 | [DZ] → R6 | ×R3 * R11 → R11 | | |
| 30 | | ×R3 * R13 → R13 | ×R5 + R7 → R7 | |
| 31 | | | | R7 → [X] |
| 32 | | | ×R12 + R11 → R11 | |
| 33 | | | ×R6 + R13 → R13 | × R11 → [Y] |
| 34 | | | | × R13 → [Z] |

☐ Use memory operand directly
× Re-use register

FIG. 8

| STEP | LOAD | MULTIPLY | ADD | STORE |
|---|---|---|---|---|
| 1 | ①㊼[X] → R0 | | | |
| 2 | ②㊽[M30] → R3 | | | |
| 3 | ③㊿[Y] → R1 | | | |
| 4 | [M31] → R4 | | | |
| 5 | ⑤[Z] → R2 | ⑥R0 ∗ R3 → R3 | | |
| 6 | ⑦[M32] → R5 | | | |
| 7 | ⑧[M00] → R6 | ⑨R1 ∗ R4 → R4 | | |
| 8 | ⑩[M01] → R7 | | | |
| 9 | ⑬[M02] → R4 | ⑪R2 ∗ R5 → R5 | | |
| 10 | ⑱[M10] → R5 | ⑭R0 ∗ R6 → R6 | | |
| 11 | | ⑯R1 ∗ R7 → R7 | | |
| 12 | ㉑[M11] → R6 | ⑲R2 ∗ R4 → R4 | ⑫ R4 + R3 → R3 | |
| 13 | ㉖[M12] → R4 | ㉒R0 ∗ R5 → R5 | | |
| 14 | | | ⑮ [M33] + R5 → R5 | |
| 15 | ㉚[M20] → R6 | ㉔R1 ∗ R6 → R6 | | |
| 16 | ㉞[M21] → R0 | ㉘R2 ∗ R4 → R4 | ⑳ R6 + R7 → R7 | |
| 17 | ㊱[M22] → R4 | | ⑰ R5 + R3 → R3 | |
| 18 | | ㉜R0 ∗ R6 → R6 | ㉓ [M03] + R4 → R4 | |
| 19 | | ㊲R1 ∗ R0 → R0 | | |
| 20 | | ㊴R2 ∗ R4 → R4 | ㉗ I/R3 → R3 | |
| 21 | | | ㉕ R4 + R7 → R7 | |
| 22 | | | ㉙ R6 + R5 → R5 | |
| 23 | | | ㉛ [M13] + R4 → R4 | |
| 24 | ㊳[DX] → R1 | ㊷R3 ∗ R7 → R7 | ㉟ [M23] + R6 → R6 | |
| 25 | | | ㊵ R0 + R4 → R4 | |
| 26 | | | ㉝ R4 + R5 → R5 | |
| 27 | ㊶[DY] → R2 | | | |
| 28 | | | ㊸ R6 + R4 → R4 | |
| 29 | ㊹[DZ] → R6 | ㊺R3 ∗ R5 → R5 | | |
| 30 | | ㊽R3 ∗ R4 → R4 | ㊻ R1 + R7 → R7 | |
| 31 | | | | ㊾R7 → [X] |
| 32 | | | ㊾ R2 + R5 → R5 | |
| 33 | | | 52 R6 + R4 → R4 | 53 R5 → [Y] |
| 34 | | | | 56 R4 → [Z] |

FIG. 9

OPTIMIZATION FOR 3-D GRAPHIC TRANSFORMATION USING SIMD COMPUTATIONS

BACKGROUND OF THE INVENTION

1. Field of the Invention

This invention relates in general to the field of computer systems, and in particular, to an apparatus and method for performing multi-dimensional graphic transformations in an SIMD environment.

2. Description of Related Art

Due to high demands in multimedia applications, multi-dimensional graphic transformations are becoming popular, especially three-dimensional (3-D) graphic and image processing. Real-time applications such as animation, scientific visualization, image modeling, video game, typically require extremely fast computations. To meet such a high demand for computations, several parallel architectures have been developed.

Among these parallel architectures, the single instructions multiple data (SIMD) model has become popular recently. A typical SIMD model processes multiple data elements simultaneously. However, the coding of an SIMD machine to solve a 3-D transformations in graphics still presents a number of problems.

First, due to the limited number of registers in an SIMD processor, the manipulation of data usually involve memory-referencing instructions, which require many clock cycles for memory accesses. Second, pipelined functional units in SIMD architecture can have long latencies. Third, most current implementations of 3-D transformations only process one vertex at each iteration.

Therefore, there is a need in the technology for providing an apparatus and method to efficiently perform 3-D transformations in a pipelined SIMD environment.

SUMMARY OF THE INVENTION

An apparatus and method for performing 3-D transformations using computer-implemented steps is described. The present invention discloses a method and apparatus for optimizing three-dimensional (3-D) transformation on N vertices of a data object based on a transformation matrix of size K×K. The method comprises: storing coordinates of the N vertices in K data items, each of the K data items having N elements; and scheduling a sequence of M operations with a set of P storage elements, the sequence of M operations performing a matrix multiplication of the transformation matrix with the K data items to produce transformed K data items, the set of P storage elements storing a plurality of intermediate results produced by the sequence of M operations.

BRIEF DESCRIPTION OF THE DRAWINGS

The features and advantages of the invention will become apparent from the following detailed description of the invention in which:

FIG. 4A illustrates a matrix multiplication as part of a 3-D graphic transformation.

FIG. 4B illustrates a viewing transformation as part of a 3-D graphic transformation.

FIG. 6 illustrates several data elements of the items used in the 3-D graphic transformation.

FIG. 8 shows a preliminary sequence of operations to perform the 3-D graphic transformation according to one embodiment of the invention.

FIG. 9 shows an optimized sequence of operations according to one embodiment of the invention.

DESCRIPTION OF THE PRESENT INVENTION

A method and apparatus for performing an efficient 3-D graphic transformation using SIMD computations is disclosed. The method maps a dependency graph into a preliminary sequence of operations. The optimization of the operations is carried out by scheduling the operations using resource conflict resolution and register usage allocation. The invention provides an efficient technique to process four vertices in each iteration.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
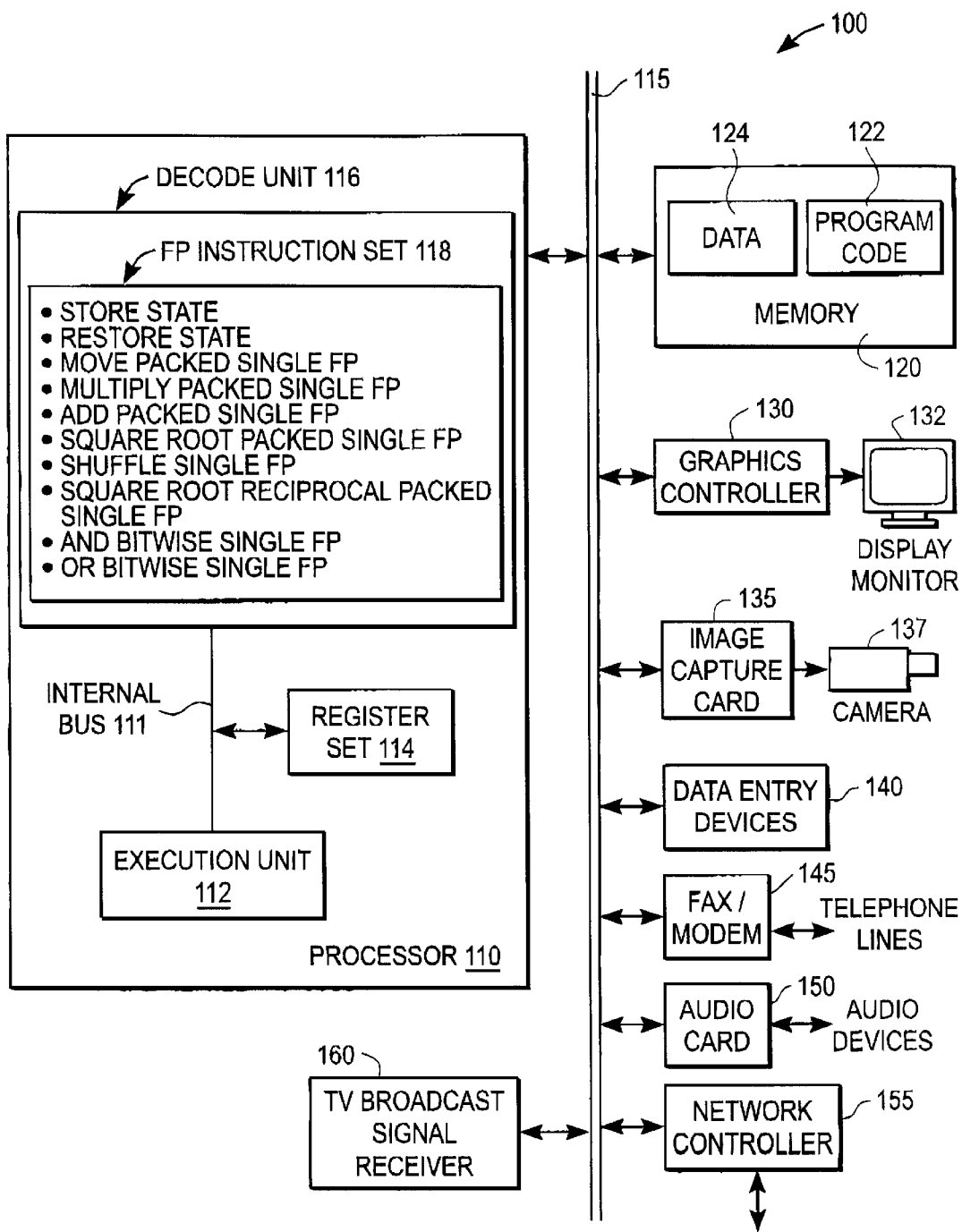
FIG. 1 is a diagram illustrating one embodiment of a computer system in accordance with the teachings of the present invention.

FIG. 1 is a diagram illustrating one embodiment of a computer system 100 in accordance with the teachings of the present invention. Computer system 100 comprises a processor 110, a storage device 120, and a bus 115. The processor 110 is coupled to the storage device 120 by the bus 115. In addition, a number of user input/output devices 140 (e.g., keyboard, mouse) are also coupled to the bus 115. The processor 110 represents a central processing unit of any type of architecture, such as CISC, RISC, VLIW, or hybrid architecture. In addition, the processor 110 could be implemented on one or more chips. The storage device 120 represents one or more mechanisms for storing data. For example, the storage device 120 may include read only memory (ROM), random access memory (RAM), magnetic disk storage mediums, optical storage mediums, flash memory devices, and/or other machine-readable mediums. The bus 115 represents one or more buses (e.g., AGP, PCI, ISA, X-Bus, VESA, etc.) and bridges (also termed as bus controllers). While this embodiment is described in relation to a single processor computer system, the invention could be implemented in a multi-processor computer system.

In addition to other devices, one or more of a network controller 155, a TV broadcast signal receiver 160, a fax/modem 145, a video capture card 135, an audio card 150, and a graphics controller 130 may optionally be coupled to bus 115. The network controller 155 represents one or more network connections (e.g., an ethernet connection). While the TV broadcast signal receiver 160 represents a device for receiving TV broadcast signals, the fax/modem 145 represents a fax and/or modem for receiving and/or transmitting analog signals representing data. The image capture card 135 represents one or more devices for digitizing images (i.e., a scanner, camera, etc.). The audio card 150 represents one or more devices for inputting and/or outputting sound (e.g., microphones, speakers, magnetic storage devices, optical storage devices, etc.). The graphics controller 130 represents one or more devices for generating images (e.g., graphics card).

FIG. 1 also illustrates that the storage device 120 has stored therein data 124 and program code 122. Data 124 represents data stored in one or more of the formats described herein. Program code 122 represents the necessary code for performing any and/or all of the techniques in the present invention. In particular, the program code 122 contains a sequence of instructions to perform 3-D graphic transformation efficiently. Of course, the storage device 120 preferably contains additional software (not shown), which is not necessary to understanding the invention.

FIG. 1 additionally illustrates that the processor 110 includes a decode unit 116, a set of registers 114, an execution unit 112, and an internal bus 111 for executing instructions. Of course, the processor 110 contains additional circuitry, which is not necessary to understanding the invention. The decode unit 116, registers 114 and execution unit 112 are coupled together by the internal bus 111. The decode unit 116 is used for decoding instructions received by processor 110 into control signals and/or microcode entry points. In response to these control signals and/or microcode entry points, the execution unit 112 performs the appropriate operations. The decode unit 116 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The decode unit 116 is shown including packed data instruction set 118 for performing operations on packed data. In one embodiment, the packed data instruction set 118 includes the following instructions: a move, a multiply, and an add. The number format for these operations can be any convenient format, including single-precision, double-precision, and extended floating-point numbers, signed and unsigned integers, and non-numeric data. In a preferred embodiment, the arithmetic operations use a single-precision 32 bit floating-point number format However, the arithmetic instructions may be applied to integer data as well. Furthermore, in one embodiment, the processor 110 is a superscalar pipelined processor (e.g., the Pentium® processor manufactured by Intel Corporation of Santa Clara, Calif.) capable of completing one or more of these packed data instructions per clock cycle (ignoring any data dependencies and pipeline freezes). In addition to the packed data instructions, the processor 110 can include new instructions and/or instructions similar to or the same as those found in existing general purpose processors. For example, in one embodiment the processor 110 supports an instruction set which is compatible with the Intel Architecture instruction set used by existing processors, such as the Pentium processor. Alternative embodiments of the invention may contain more or less, as well as different, packed data instructions and still utilize the teachings of the invention.

The registers 114 represent a storage area on processor 110 for storing information, including control/status information, integer data, floating point data, and packed data (floating point and/or integer). According to these aspects of the invention, the storage area used for storing the packed data is not critical. The term data processing system is used herein to refer to any machine for processing data, including the computer systems(s) described with reference to FIG. 1.

Figure 2:
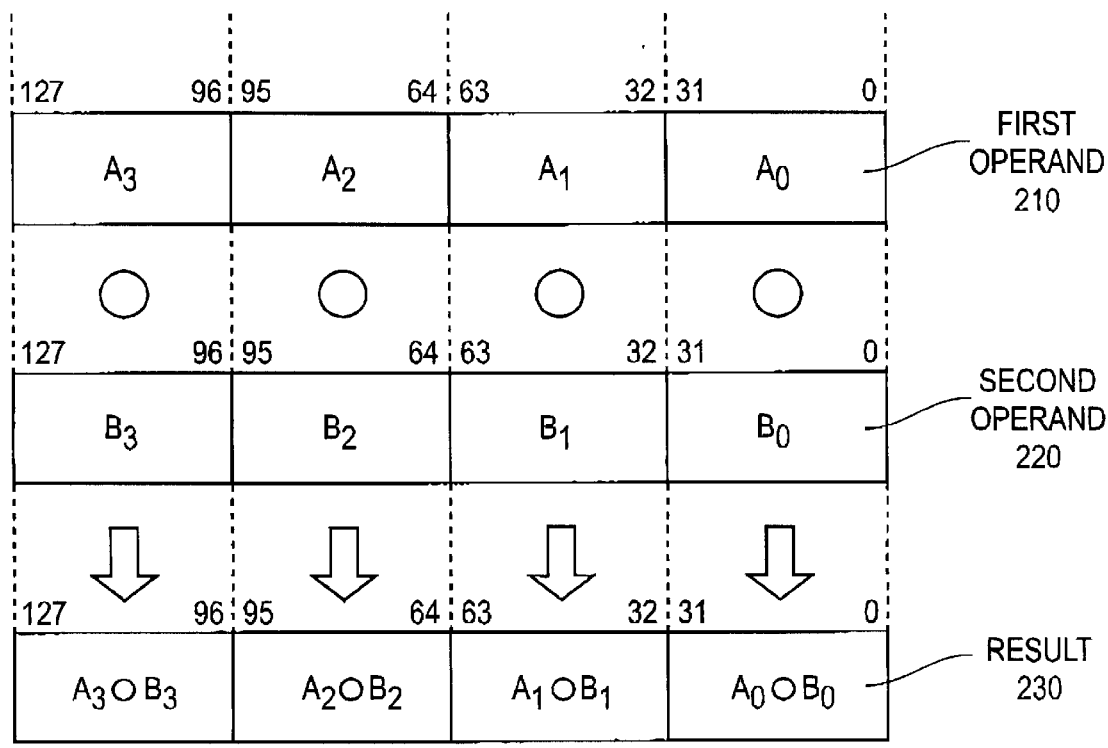
FIG. 2 illustrates a parallel vertical SIMD operation according to one embodiment of the invention.

FIG. 2 illustrates a parallel operation according to one embodiment of the present invention. In one embodiment, the operation, denoted by the operator "o", involves two operands, a first operand 210 and a second operand 220, to produce a result 230. The term "operand" is interchangeably used herein to refer to the data on which an instruction operates or the storage area (e.g., register, memory location, etc.) in which that data can be found. Each of the operands 210 and 220 is a packed data item, comprising four separate data elements, each data element is 32-bit wide for a total operand size of 128-bit. In one embodiment, each data element in a packed data item is a floating-point number. In another embodiment, each data element in a packed data item is an integer number. It will be appreciated by one skilled in the art that any number of data elements in each operand and any data element size for each data element can be utilized. It will be further appreciated by one skilled in the art that the data element sizes in each operand may be different.

In the embodiment shown in FIG. 2, the first operand 210 is 128-bit wide, having four data elements: $A_0$, $A_1$, $A_2$, and $A_3$. Each of the data elements $A_0$, $A_1$, $A_2$, and $A_3$ is 32-bit wide. Similarly, the second operand 220 is 128-bit wide, having 4 data elements: $B_0$, $B_1$, $B_2$, and $B_3$. Each of the data elements $B_0$, $B_1$, $B_2$, and $B_3$ is 32-bit wide. The operation "o" operates on these four pairs of data elements in parallel to produce the four independent result elements in the result 230: $A_0 \circ B_0$, $A_1 \circ B_1$, $A_2 \circ B_2$, and $A_3 \circ B_3$. Each of these result data elements is 32-bit wide.

The operation "o" may be any operation that can be performed on multiple operands (all in parallel, serially data element by data element, pairs of data elements in parallel, etc.) in response to executing a single instruction. Examples of the operation "o" include add, subtract, multiply, divide, compare, reciprocal, reciprocal square root, and bitwise logical operations (e.g., AND, OR, XOR).

BASIC SIMD OPERATIONS

The number format for the data elements in the packed data items can be any convenient format, including single-precision, double-precision, and extended floating-point numbers, signed and unsigned integers, and non-numeric data. In a preferred embodiment, the number format is single precision 32-bit floating-point number. However, any number format can be used. In the following, the descriptor "packed single" refers to the packed single precision floating-point number. In addition, a packed data item contains multiple elements. Each of these elements occupy a position, or a location, in the packed data item. For ease of reference, the most significant location is referred to as the first location, etc.

Figure 3:
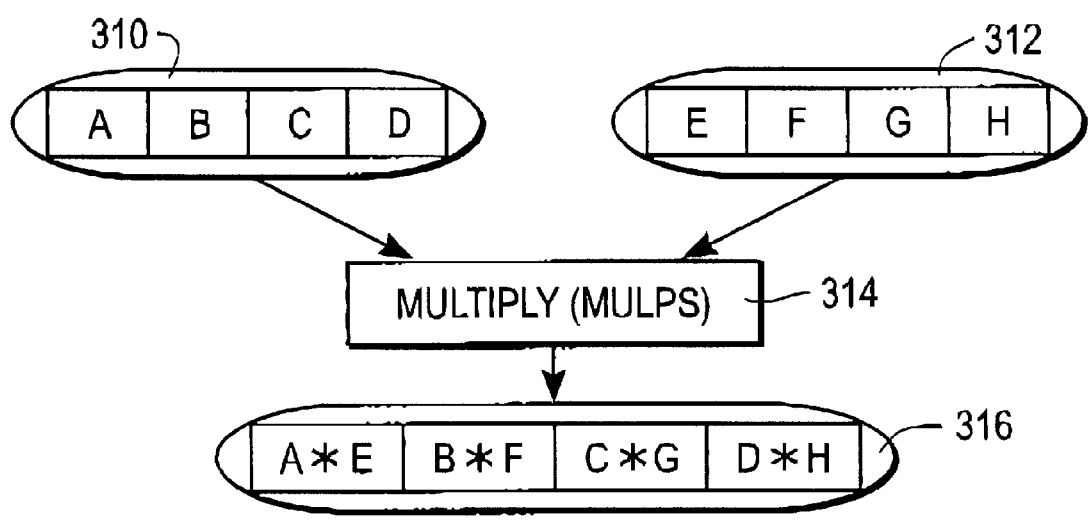
FIG. 3 illustrates the operation of a multiply packed single instruction according to one embodiment of the invention.

FIG. 3 illustrates the operation of a multiply packed single instruction (MULPS) according to one embodiment of the invention. In one embodiment, data items are represented by ovals, while instructions or operations are represented by rectangles. In another embodiment, storage areas containing the data items are represented by ovals, while circuits or hardware elements are represented by rectangles.

In FIG. 3, the data elements A, B, C, and D, of a first operand 310 are multiplied with the respective E, F, G, and H packed data elements of a second operand 312 to generate a result 316. For example, data element A of the first operand 310 is multiplied with the corresponding data element E of the second operand 312 to produce the result A*E stored in the corresponding location of result 316.

Other operations are performed in a similar manner as the above multiply packed single instruction. Some operations may involve one operand, while others may involve two operands. Examples of these operations are: move aligned packed single (MOVAPS), divide packed single (DIVPS), add packed single (ADDPS), subtract packed single (SUBPS), square root packed single (SQRTPS), square root reciprocal packed single (RSQRTPS), reciprocal packed single (RCPPS), bitwise logical AND for single (ANDPS), bitwise logical OR for single (ORPS), bitwise logical XOR for single (XORPS). Any other arithmetic and logical operations (e.g., complementation, negation, NAND, NOR, XNOR or equivalence) can also be used.

3-D GRAPHIC TRANSFORMATION

A typical 3-D graphic transformation involves a matrix multiplication followed by a viewing transformation. The matrix multiplication corresponds to geometrical transformations such as translation, scaling, and rotation. The viewing transformation involves the mapping of the transformed object to fit the display screen for viewing purposes.

FIG. 4A illustrates a matrix multiplication operation. In this illustrative example, matrices M and F are multiplied together to produce a matrix P0. Matrix M is organized as a 4×4 matrix. Matrix F is a column vector, organized as 4×1. Matrix P0 is a column vector, organized as 4×1.

FIG. 4B illustrates a viewing transformation. In this illustrative example, matrix P0 is multiplied by a scalar component (1/W0) and added to a column vector D to produce the final column vector P1. The column vector D representing the displacement vector for the viewing origin.

As will be explained later, the elements in matrices M, F, P0, P1 and D are themselves vectors which correspond to multiple vertices in the 3-D object. In one embodiment, the number of vertices for each vector is 4. Each 3-D graphic transformation shown in FIGS. 4A and 4B therefore corresponds to 4 vertices.

Figure 5:
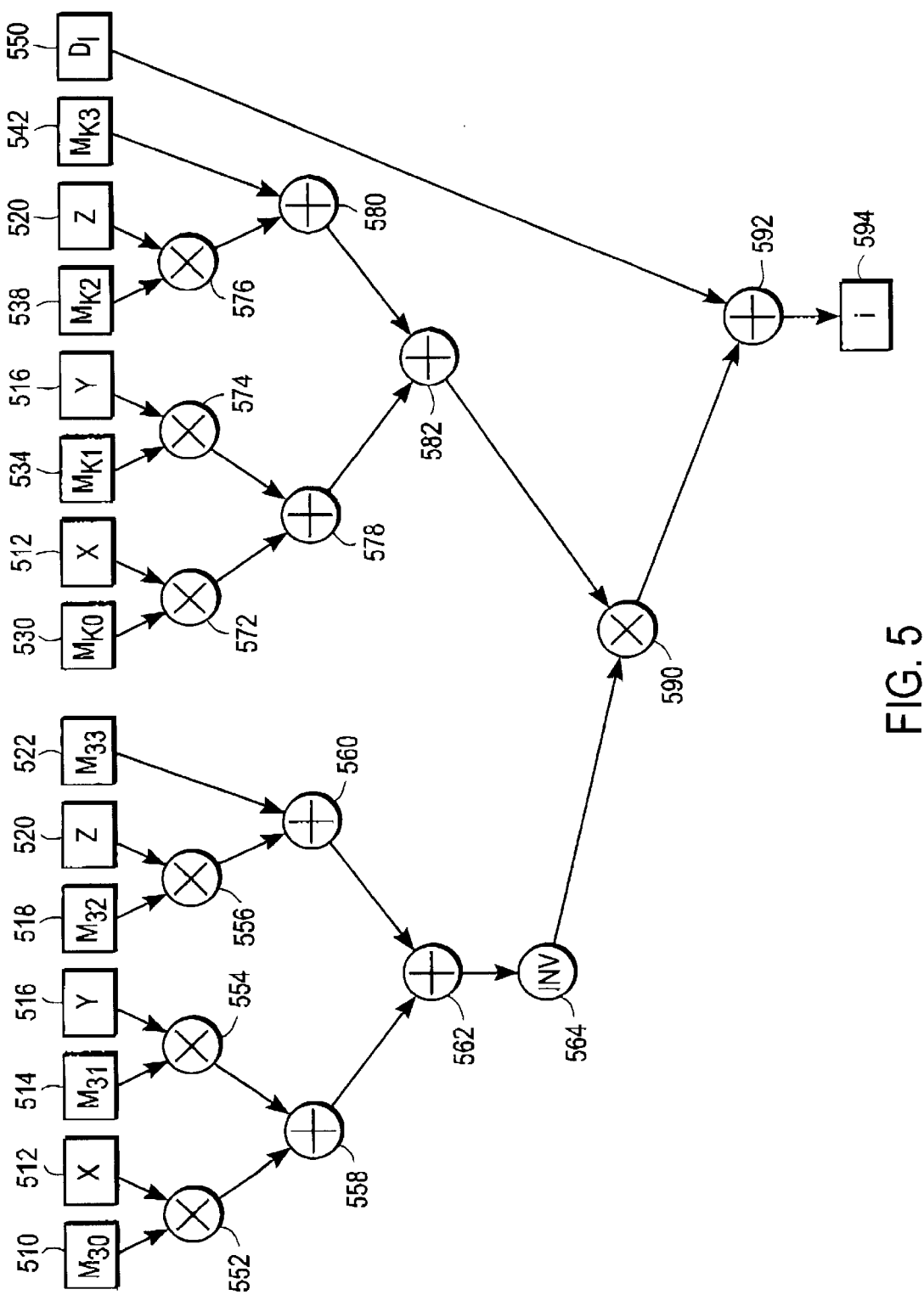
FIG. 5 illustrates a dependency graph for the 3-D graphic transformation shown in FIGS. 4A and 4B according to one embodiment of the invention.

FIG. 5 illustrates a dependency graph for the 3-D graphic transformation shown in FIGS. 4A and 4B according to one embodiment of the invention. The dependency graph shows the data dependencies among various operations. Analysis of a dependency graph is useful to generate an optimal scheduling policy.

In FIG. 5, a rectangle represents a storage element, and a circle represents a computational operation. The dependency graph illustrates the following computations:

$$W_0 = m_{30}*x + m_{31}*y + m_{32}*z + m_{33} \quad (1)$$

$$I_0 = m_{k0}*x + m_{k1}*y + m_{k2}*z + m_{k3} \quad (2)$$

$$I_1 = (1/W_0)*I_0 + d_i \quad (3)$$

where I=X, Y, Z i=x, y, z k=0, 1, and 2 corresponding to I=X, Y, and Z, respectively.

As shown in FIG. 5, element 510, 512, 514, 516, 518, 520, 522, 530, 534, 538, 542, and 550 store the data $m_{30}$, x, $m_{31}$, y, $m_{32}$, z, $m_{33}$, $m_{k0}$, $m_{k1}$, $m_{k2}$, $m_{k3}$, and $d_i$, respectively. For brevity, elements 530, 534, 538, 542, and 550 are shown as representative for the computations of the X, Y, and Z components. Therefore, when k=0, then i=x and the graph represents the computation for $X_0$ and $X_1$. Similarly, when k=1, then i=y, and the graph represents the computation for $Y_0$ and $Y_1$. Finally, when k=2, then i=z, and the graph represents the computation for $Z_0$ and $Z_1$. For illustrative purposes, in the discussion that follows, the X components will be used.

The operations 552, 554, 556, 572, 574, 576, and 590 represent the multiplication operation. The operations 558, 560, 562, 578, 580, 582, and 592 represent the add operation. The operation 564 represents the inverse or reciprocal operation.

As seen from FIG. 5, the operation 562 generates the element $W_0$ in accordance with the equation (1). The operation 564 generates the element (1/$W_0$). There are a number of ways to perform the operations 564. For related precision (e.g., 12 bit), a fast table lookup instruction such as the reciprocal instruction can be used. For full precision (e.g., 24 bit), a regular divide instruction can be used. For intermediate precision (e.g., between 12 and 24 bits), an iterative algorithm like the Newton-Ralphson method can be used. The operation 582 generates the element $I_0$ in accordance with the equation (2). Finally, the operation 592 generates the element $I_1$ in accordance with equation (3).

The dependency graph shows that while the computations of W0, X0, Y0, and Z0 are mutually independent, the computation of X1, Y1, and Z1 depends on the result of W0. Therefore, it is important to compute W0 first; or if there is a conflict between the computation of W0 and the computations of X0, Y0, and Z0, then the computation of W0 will be given higher priority.

SIMD computations of the 3-D graphic transformation:

The SIMD computation of the above 3-D graphic transformation processes 4 vertices at a time using the packed data items.

Figure 6:
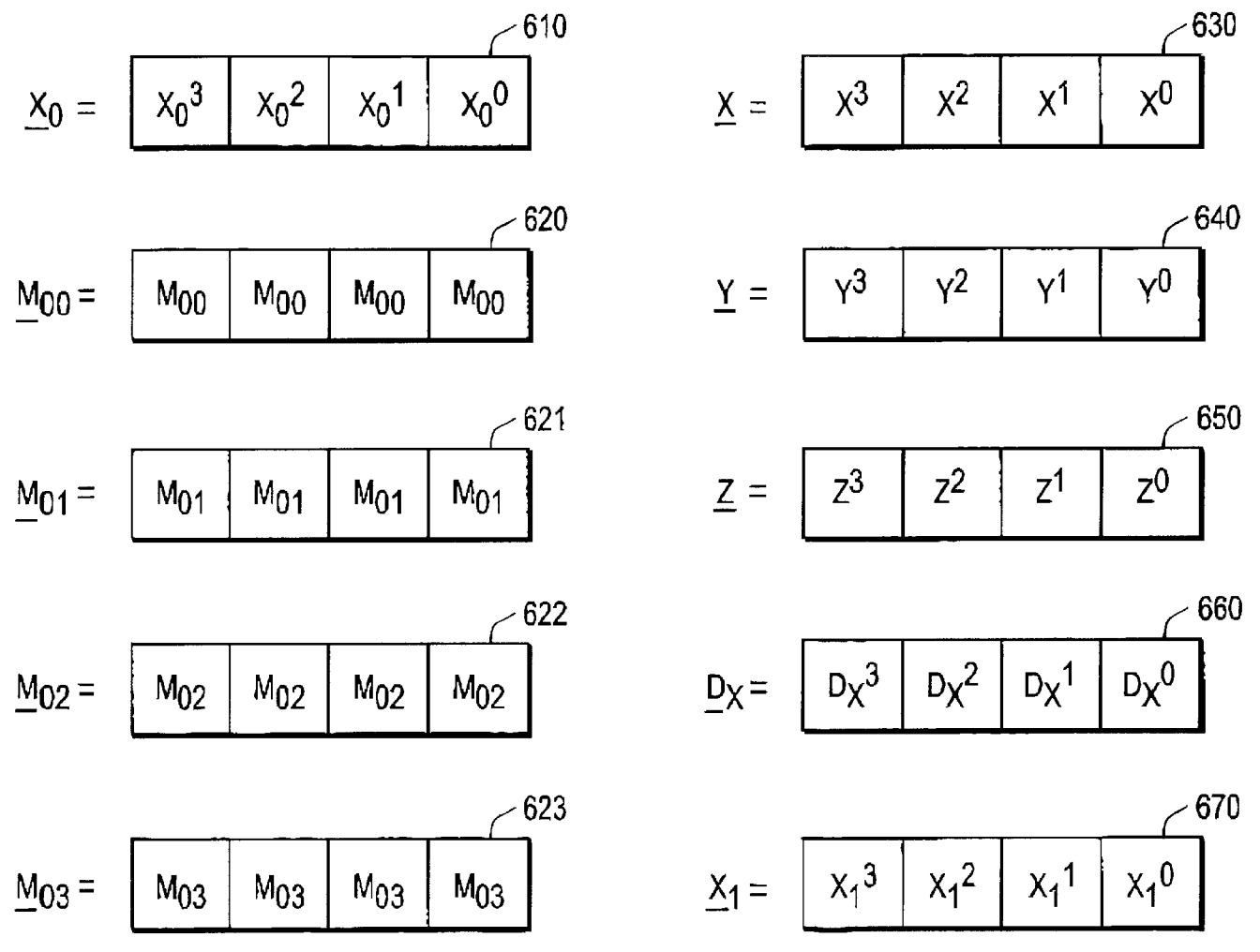

FIG. 6 illustrates several data elements of the items used in the 3-D graphic transformation of the $X_1$ component.

As discussed earlier, each element in the matrices itself is a vector containing data for multiple vertices. In one embodiment, the number of elements in the vector is 4, corresponding to 4 vertices in the 3-D object.

The data items 610, 630, 640, 650, and 670 correspond to the vectors $X_0$, X, Y, Z, and $X_1$, respectively. The vectors Y0, Y1, Z0, and Z1 are represented in a similar fashion. Each of these vectors stores 4 elements, corresponding to 4 vertices. The superscripts indicate the element number. The data items 620, 621, 622, 623, and 660 correspond to the transformation elements m00, m01, m02, m03, and dx. Since the 3-D transformation is global to all vertices in the 3-D object, the elements of the vectors m00, m01, m02, m03, and dx.

The computation of the item X1 is given by the following equations:

$$X_0 = m_{00}*X + m_{01}*Y + m_{02}*Z + m_{03} \quad (4)$$

$$X_1 = (1/W_0)*X_0 + d_x \quad (5)$$

where $W_0$ is computed in equation (1).

The above two equations (4) and (5) are carried out for 4 vertices at a time. In an SIMD environment, these 4 vertices are performed simultaneously as follows:

$$x_0^0 = m_{00}*x^0 + m_{01}*y^0 + m_{02}*z^0 + m_{03} \quad (6a)$$

$$x_0^1 = m_{00}*x^1 + m_{01}*y^1 + m_{02}*z^1 + m_{03} \quad (6b)$$

$$x_0^2 = m_{00}*x^2 + m_{01}*y^2 + m_{02}*z^2 + m_{03} \quad (6c)$$

$$x_0^3 = m_{00}*x^3 + m_{01}*y^3 + m_{02}*z^3 + m_{03} \quad (6d)$$

$$x_1^0 = (1/W_0)*x_0^0 + d_x \quad (7a)$$

$$x_1^1 = (1/W_0)*x_0^1 + d_x \quad (7b)$$

$$x_1^2 = (1/W_0)*x_0^2 + d_x \quad (7c)$$

$$x_1^3 = (1/W_0)*x_0^3 + d_x \quad (7d)$$

Similar equations can be obtained for the Y and Z components of the 4 vertices. It is therefore important to note that the dependency graph shown in FIG. 5 corresponds to computations of 4 vertices simultaneously.

Figure 7A:
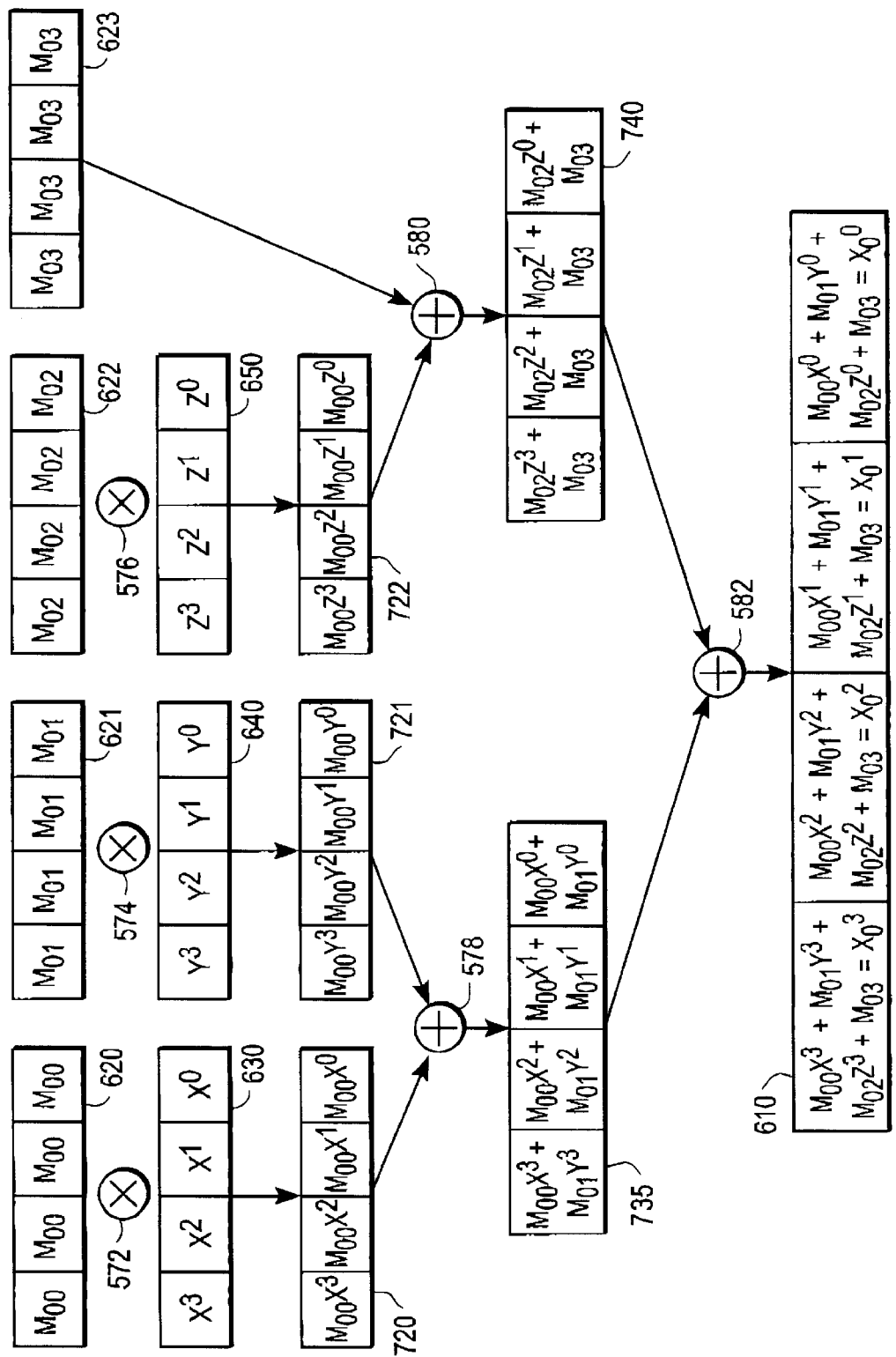
FIG. 7A illustrates a data flow graph to compute the matrix multiplication shown in FIG. 4A according to one embodiment of the invention.

FIG. 7A illustrates a data flow graph to compute the matrix multiplication shown in FIG. 4A according to one embodiment of the invention.

The data items 620, 621, 622, and 623 store the elements of the matrix m. As discussed above, in each data item, the elements are identical. The data items 630, 640, and 650 store the x, y, and z components, respectively, of 4 vertices. The data items 735 and 740 store the partial sums of the matrix multiplication operation. The data item 610 stores the result of the matrix multiplication for the 4 vertices as shown in equations 6a, 6b, 6c, and 6d.

Figure 7B:
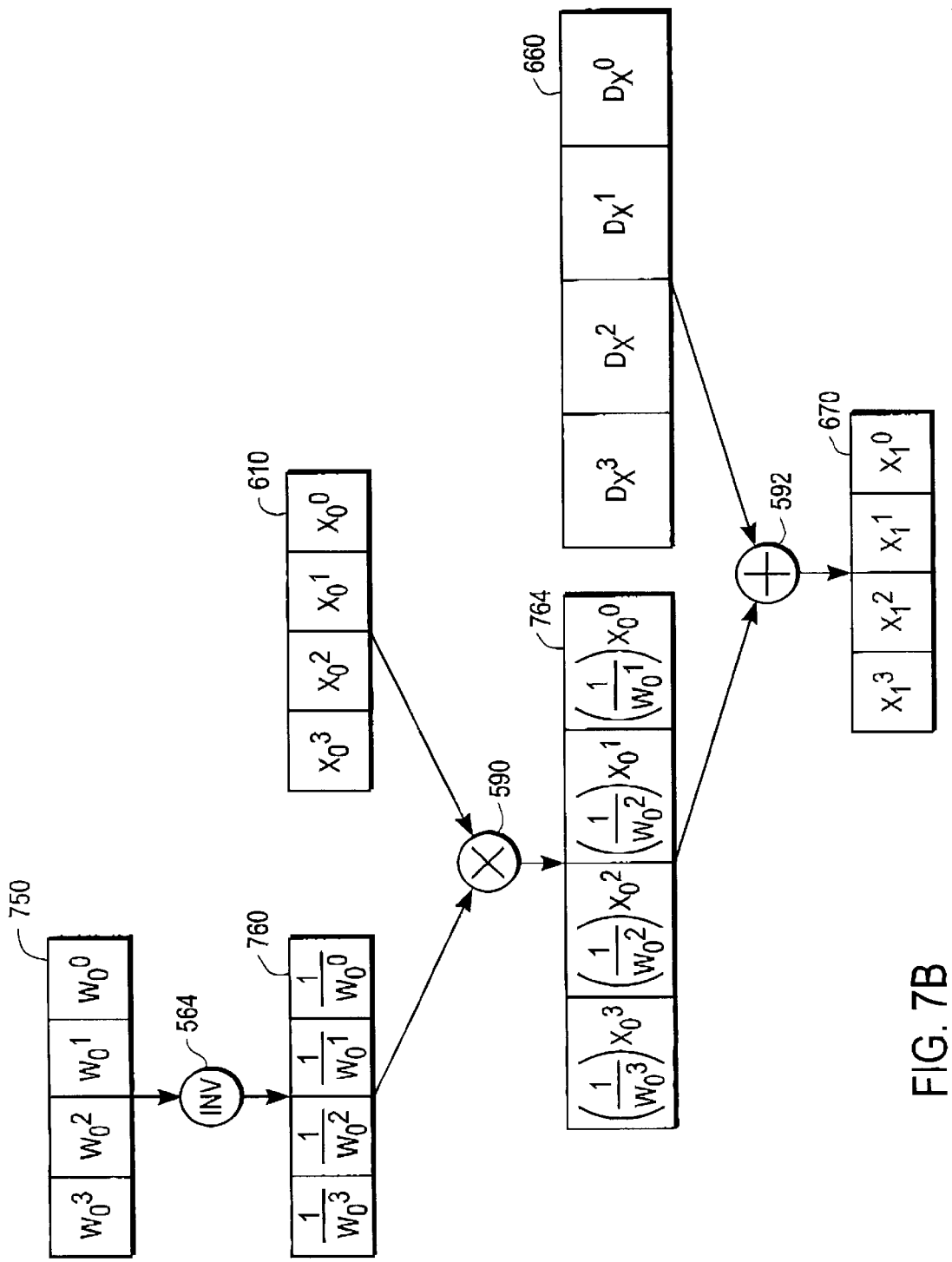
FIG. 7B illustrates a data flow graph to compute the viewing transformation shown in FIG. 4B according to one embodiment of the invention.

FIG. 7B illustrates a data flow graph to compute the viewing transformation shown in FIG. 4B according to one embodiment of the invention.

The data items 750 stores the W0 elements of the 4 vertices. The operation 564 is the inverse or reciprocal operation. The data item 760 stores the $(1/W_0)$ elements of the 4 vertices. The data item 764 stores the result of the scalar multiplication of the $x_0^k$ (k=0, ..., 3) with the $(1/W_0)$ elements. The data item 660 stores the displacement components $d_x$. The data item 670 stores the result of the viewing transformation for the 4 vertices as shown in equations 7a, 7b, 7c, and 7d.

3-D GRAPHIC TRANSFORMATION USING AN OPTIMAL SCHEDULING STRATEGY

To enhance the performance of the 3-D graphic transformation, it is desirable that all computations take place within the processor to avoid the long cycle time associated with the memory-referencing instructions. Therefore, all data should be loaded into the registers. However, as seen from the dependency graph in FIG. 5, the number of the required storage areas for the input data and the intermediate results is quite large. This number typically exceeds the number of registers available in the processor. In one embodiment, the number of architecturally visible packed data registers available for SIMD computations is 8. Therefore, the register usage should be allocated according to an optimal scheduling strategy. The basic strategy of register usage is to rename or re-use a register as soon as it is no longer needed.

Another problem with the pipelined SIMD architecture is the inherent latencies caused by executing instructions in the pipeline. In general, the latency rule states that it is necessary to wait for some amount of clock cycles before using the result produced by an operation. This latency rule is applicable for most pipelined operations including load, multiply, and add operations.

Lastly, the number of functional units (e.g., adder, multiplier) in a typical pipelined SIMD machine is limited. Therefore, conflicts at the functional units should be resolved by allowing only one operation at a time. Furthermore, operations that are depended upon by many other operations should be given high priority. For example, in the 3-D graphic transformation, the computation of W0 should be given higher priority than the computations of X0, Y0, and Z0 because the latter computations require the result of W0.

FIG. 8 shows a preliminary sequence of operations to perform the 3-D graphic transformation according to one embodiment of the present invention.

There are 4 types of operation: load, multiply, add, and store. In the preliminary sequence of operations, it is assumed that there is no limit on the number of available registers. However, a register will be re-used as soon as it is clear that it is available. In the optimization step, additional register re-allocations will be carried out. The preliminary sequence also does not take into account the resource conflicts, i.e., several functional units (adder, multiplier) are assumed to be available at the same time. The preliminary sequence therefore is a direct mapping of the dependency graph into a sequence of operations without consideration of register and resource limitations and latency rules.

There are 34 steps for the preliminary sequence. Each step may correspond to several operations. In FIG. 8, brackets indicate memory locations, Ri indicates architecturally visible register i. Additional notations are used to indicate optimization will be performed. An X on the left of an operation indicates that the register will be re-named, i.e., another register will be re-used. The register renaming can be performed by a number of methods, including the user of coding aids and/or a computer. A square on the left of an operation indicates that the operand can be used directly from the memory rather than from a register.

The preliminary sequence in FIG. 8 corresponds to the dependency graph shown in FIG. 5. The intermediate results are obtained as follows.

| After step | Contents of registers Due to multiply | Due to Add |
|---|---|---|
| 5 | R3 = m30*x | |
| 7 | R4 = m31*y | |
| 9 | R5 = m32*z | |
| 10 | R6 = m00*x | |
| 11 | R1 = m01*y | |
| 12 | R8 = m02*z | R3 = m30*x + m31*y |
| 13 | R9 = m10*x | |
| 14 | | R5 = m32*z + m33 |
| 15 | R11 = m11*y | |
| 16 | R12 = m12*z | R7 = m00*x + m01*y |
| 17 | | R5 = $w_0$ |
| 18 | R10 = m20*y | R8 = m02*z + m03 |
| 19 | R13 = m21*y | |
| 20 | R6 = m22*z | R3 = $1/w_0$ |
| 21 | | R7 = x0 |
| 22 | | R11 = m10*x + m11*y |
| 23 | | R12 = m12*z + m13 |
| 24 | R7 = (1/w0)*x0 | R8 = m20*x + m23 |
| 25 | | R6 = m21*y + m22*z |
| 26 | | R11 = y0 |
| 28 | | R8 = z0 |
| 29 | R11 = (1/w0)*y0 | |
| 30 | R13 = (1/w0)*z0 | R7 = (1/w0)*x0 + dx |
| 32 | | R11 = (1/w0)*y0 + dy |
| 33 | | R13 = (1/w0)*z0 + dz |

As seen in the above sequence, the number of registers is 13 and several operations take place concurrently. In addition, the latency rule is not followed. The optimization phase will remove these violations and provide an efficient scheduling.

OPTIMIZATION OF THE PRELIMINARY SEQUENCE

The optimization of the preliminary sequence performs three main tasks:

1) Re-allocation of registers: Assuming the number of available architecturally visible registers is 8 (from R0 through R7), register re-naming will be carried out to re-use any register that does not contain useful data any more.
2) Use operand directly from memory: If an operand in the memory is used only once, it is a waste to load it into a register. If an operation that can be performed directly on such an operand, the register loading step will be bypassed. In the above 3-D graphic transformation, these operands are m33 (step 11), m03 (step 14), m13 (step 18), and m23 (step 22). These operands are used only once in the addition. Since addition can be performed on a memory operand directly in one embodiment of the invention, the register loading step will be bypassed, reducing the register usage.
3) Applying the latency rules: A result of an operation will not be used immediately in the next clock to avoid pipeline data hazards. The ordering of the operations therefore will be re-arranged to follow the latency rules while not changing the logic of the program flow.
4) Loop processing: The preliminary sequence of operations correspond to an iteration of processing. Each iteration processes 4 vertices as discussed above. A loop processing is further optimized by overlapping the end of one iteration with the beginning of the next iteration.

FIG. 9 shows an optimized sequence of operations according to one embodiment of the present invention.

In FIG. 9, a circled number on the left of an operation indicates the instruction number in the optimized sequence. The operations in FIG. 9 correspond to the following assembly code. It is assumed that the register %esi is zero and register %eax already contains the appropriate pointer to the memory locations. In the assembly code, the notation xmmi corresponds to architecturally visible register Ri in FIG. 9. The assembly notation is:

operation source, destination

For example, the assembly code "addps %xmm4, %xmm7" corresponds to the operation "R4+R7—>R7". Alternative embodiments can use a different notation (e.g., operational source1, source2, destination).

| No. | Assembly code | Operation |
|---|---|---|
| 1 | movaps TRICOUNT*0 (%eax, %esi, 4), %xmm0 | R0=x |
| 2 | movaps matrix+3*16, %xmm3 | R3=m30 |
| 3 | movaps TRICOUNT*4 (%eax, %esi, 4), %xmm1 | R1=y |
| 4 | movaps matrix+7*16, %xmm4 top_xf: | R4=m31 |
| 5 | movaps TRICOUNT*8 (%eax, %esi, 4), %xmm2 | R2=z |
| 6 | mulps %xmm0, %xmm3 | R3=m30*x |
| 7 | movaps matrix+11*16, %xmm5 | R5=m32 |
| 8 | movaps matrix+0*16, %xmm6 | R6=m00 |
| 9 | mulps %xmm1, %xmm4 | R4=m31*y |
| 10 | movaps matrix+4*16, %xmm7 | R7=m01 |
| 11 | mulps %xmm2, %xmm5 | R5=m32*z |
| 12 | addps %xmm4, %xmm3 | R3=m30*x+m31*y |
| 13 | movaps matrix+8*16, %xmm4 | R4=m02 |
| 14 | mulps %xmm0, %xmm6 | R6=m00*x |
| 15 | addps matrix+15*16, %xmm5 | R5=m32*z+m33 |
| 16 | mulps %xmm1, %xmm7 | R7=m01*y |

-continued

| No. | Assembly code | Operation |
|---|---|---|
| 17 | addps %xmm5, %xmm3 | R3=W0 |
| 18 | movaps matrix+1*16, %xmm5 | R5=m10 |
| 19 | mulps %xmm2, %xmm4 | R4=m02*z |
| 20 | addps %xmm6, %xmm7 | R7=m00*z+m01*y |
| 21 | movaps matrix+5*16, %xmm6 | R6=m11 |
| 22 | mulps %xmm0, %xmm5 | R5=m10*x |
| 23 | addps matrix+12*16, %xmm4 | R4=m02*z+m03 |
| 24 | mulps %xmm1, %xmm6 | R6=m11*y |
| 25 | addps %xmm4, %xmm7 | R7=x0 |
| 26 | movaps matrix+9*16, %xmm4 | R4=m12 |
| 27 | rcpps %xmm3, %xmm3 | R3=1/W0 |
| 28 | mulps %xmm2, %xmm4 | R4=m12*z |
| 29 | addps %xmm6, %xmm5 | R5=m10*x+m11*y |
| 30 | movaps matrix+2*16, %xmm6 | R6=m20 |
| 31 | addps matrix+13*16, %xmm4 | R4=m12*z+m13 |
| 32 | mulps %xmm0, %xmm6 | R6=m20*x |
| 33 | addps %xmm4, %xmm5 | R5=y0 |
| 34 | movaps matrix+6*16, %xmm0 | R0=m21 |
| 35 | addps matrix+14*16, %xmm6 | R6=m20*x+m23 |
| 36 | movaps matrix+2*16, %xmm4 | R4=m22 |
| 37 | mulps %xmm1, %xmm0 | R0=m21*y |
| 38 | movaps disp_x, %xmm1 | R1=dx |
| 39 | mulps %xmm2, %xmm4 | R4=m22*z |
| 40 | addps %xmm0, %xmm4 | R4=m22*z+m23 |
| 41 | movaps disp_y, %xmm2 | R2=dy |
| 42 | mulps %xmm3, %xmm7 | R7=x(1/W0)*x0 |
| 43 | addps %xmm6, %xmm4 | R4=z0 |
| 44 | movaps disp_z, %xmm6 | R6=dz |
| 45 | mulps %xmm3, %xmm5 | R5=(1/W0)*y0 |
| 46 | addps %xmm1, %xmm7 | R7=x1 |
| 47 | movaps 16+TRICOUNT*0 (%eax, %esi, 4), %xmm0 | R0=x |
| 48 | mulps %xmm3, %xmm4 | R4=(1/W0)*z0 |
| 49 | addps %xmm2, %xmm5 | R5=Y1 |
| 50 | movaps 16+TRICOUNT*4 (%eax, %esi, 4), %xmm1 | R1=y |
| 51 | movaps %xmm7, TRICOUNT*20 (%eax, %esi, 4) | [x1]=x1 |
| 52 | addps %xmm6, %xmm4 | R4=z1 |
| 53 | movaps %xmm5, TRICOUNT*24 (%eax, %esi, 4) | [y1]=y1 |
| 54 | addl $4, %esi | update loop counter |
| 55 | movaps matrix+3*16, %xmm3 | R3=m30 |
| 56 | movaps %xmm4, TRICOUNT*28 (%eax, %esi, 4) | [z1]=z1 |
| 57 | cmp TRICOUNT, %esi | compare |
| 58 | movaps matrix+7*16, %xmm4 | R4=m31 |
| 59 | jnz top_xf | if loop not over jump back |
| 60 | leave | return |
| 61 | ret | |

The assembly instructions numbered 54, 57–61 are not used in the scheduling because they correspond to loop maintenance and subroutine return.

The above assembly code processes four vertices in each iteration with optimized scheduling. The result is an extremely fast 3-D graphic transformation.

The present invention discloses a method to optimize the computations of a 3-D graphic transformation by an efficient scheduling strategy. The method provides an extremely fast processing of graphic data with optimal resource utilization.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   storing coordinates of N vertices in K data items in storage device, each of the K data items having N elements, N and K being positive integers, N and K being at least 2; and scheduling a sequence of M operations with a set of P storage elements wherein scheduling the sequence of M operations comprises ordering the M operations according to a latency rule, the sequence of M operations performing a matrix multiplication of a transformation matrix of size KxK with the K data items to produce transformed K data items, the set of P storage elements storing a plurality of intermediate results produced by the sequence of M operations, M and P being positive integers, M and P being at least 2.

2. The method of claim 1 wherein the sequence of M operations further performs a viewing transformation.

3. The method of claim 1 wherein the scheduling further comprises:

allocating P storage elements to store the plurality of intermediate results.

4. The method of claim 3 wherein the allocating P storage elements re-uses one of P storage elements in one of M operations when said one of P storage elements does not contain a data needed in operations subsequent to said one of M operations.

5. The method of claim 1 wherein the ordering the M operations comprises using a result of one of the M operations after a delay according to the latency rule.

6. The method of claim 3 wherein the M operations include a plurality of load operations, a plurality of multiply operations, and a plurality of add operations.

7. The method of claim 3 wherein each of the P storage elements stores N data elements.

8. The method of claim 7 wherein each of the M operations operates on N data elements simultaneously.

9. The method of claim 1 wherein N [=4] is a power of 2.

10. The method of claim 1 wherein M>P.

11. An apparatus comprising:

a memory for storing K data items, the K data items storing coordinates of N vertices, each of the K data items having N elements, N and K being positive integers, N and K being at least 2: and a processor for executing a sequence of M operations, the sequence of M operations being scheduled with a set of P storage elements, the M operations being ordered according to a latency rule, the sequence of M operations performing a matrix, of size KxK, multiplication of the transformation matrix with the K data items to produce transformed K data items, the set of P storage elements storing a plurality of intermediate results produced by the sequence of M operations, M and P being positive integers, M and P being at least 2.

12. The apparatus of claim 11 wherein the sequence of M operations further performs a viewing transformation.

13. The apparatus of claim 11 wherein the P storage elements are allocated to store the plurality of intermediate results.

14. The apparatus of claim 13 wherein one of the P storage elements in one of the M operations is re-used when said one of the P storage elements does not contain a data needed in operations subsequent to said one of the M operations.

15. The apparatus of claim 13 wherein a result of one of the M operations is used by another one of the M operations after a delay according to the latency rule.

16. The apparatus of claim 13 wherein the M operations include a plurality of load operations, a plurality of multiply operations, and a plurality of add operations.

17. The apparatus of claim 13 wherein each of the P storage elements stores N data elements.

18. The apparatus of claim 17 wherein each of the M operations operates on N data elements simultaneously.

19. The apparatus of claim 11 wherein N[=4] is a power of 2.

20. The apparatus of claim 11 wherein M>P.

21. A computer program product comprising:

a computer usable medium having computer program code embodied therein, the computer program product having:

computer readable program code for storing coordinates of N vertices in K data items in a storage device, each of the K data items having N elements, N and K being positive integers, N and K being at least 2; and computer readable program code for scheduling a sequence of M operations with a set of P storage elements wherein the computer readable program code for scheduling comprises computer readable program code for ordering the M operations according to a latency rule, the sequence of M operations performing a matrix multiplication of a transformation matrix of size KxK with the K data items to produce transformed K data items, the set of P storage elements storing a plurality of intermediate results produced by the sequence of M operations, M and P being positive integers, M and P being at least 2.

22. The computer program product of claim 21 wherein the sequence of M operations further performs a viewing transformation.

23. The computer program product of claim 21 wherein the computer readable program code for scheduling further comprises:

computer readable program code for allocating P storage elements to store the plurality of intermediate results.

24. The computer program product of claim 23 wherein the computer readable program code for allocating P storage elements re-uses one of P storage elements in one of M operations when said one of P storage elements does not contain a data needed in operations subsequent to said one of M operations.

25. The computer program product of claim 21 wherein the computer readable program code for ordering the M operations comprises computer readable program code for using a result of one of the M operations after a delay according to the latency rule.

26. The computer program product of claim 23 wherein the M operations include a plurality of load operations, a plurality of multiply operations, and a plurality of add operations.

27. The computer program product of claim 23 wherein each of the P storage elements stores N data elements.

28. The computer program product of claim 27 wherein each of the M operations operates on N data elements simultaneously.

29. The computer program product of claim 21 wherein N [=4] is a power of 2.

30. The computer program product of claim 21 wherein M>P.

* * * * *